Dec. 31, 1968   J. C. PANGLE, JR   3,419,493
RECLAIMING WATER FROM TEXTILE MILL WASTE WATERS
Filed Dec. 22, 1966
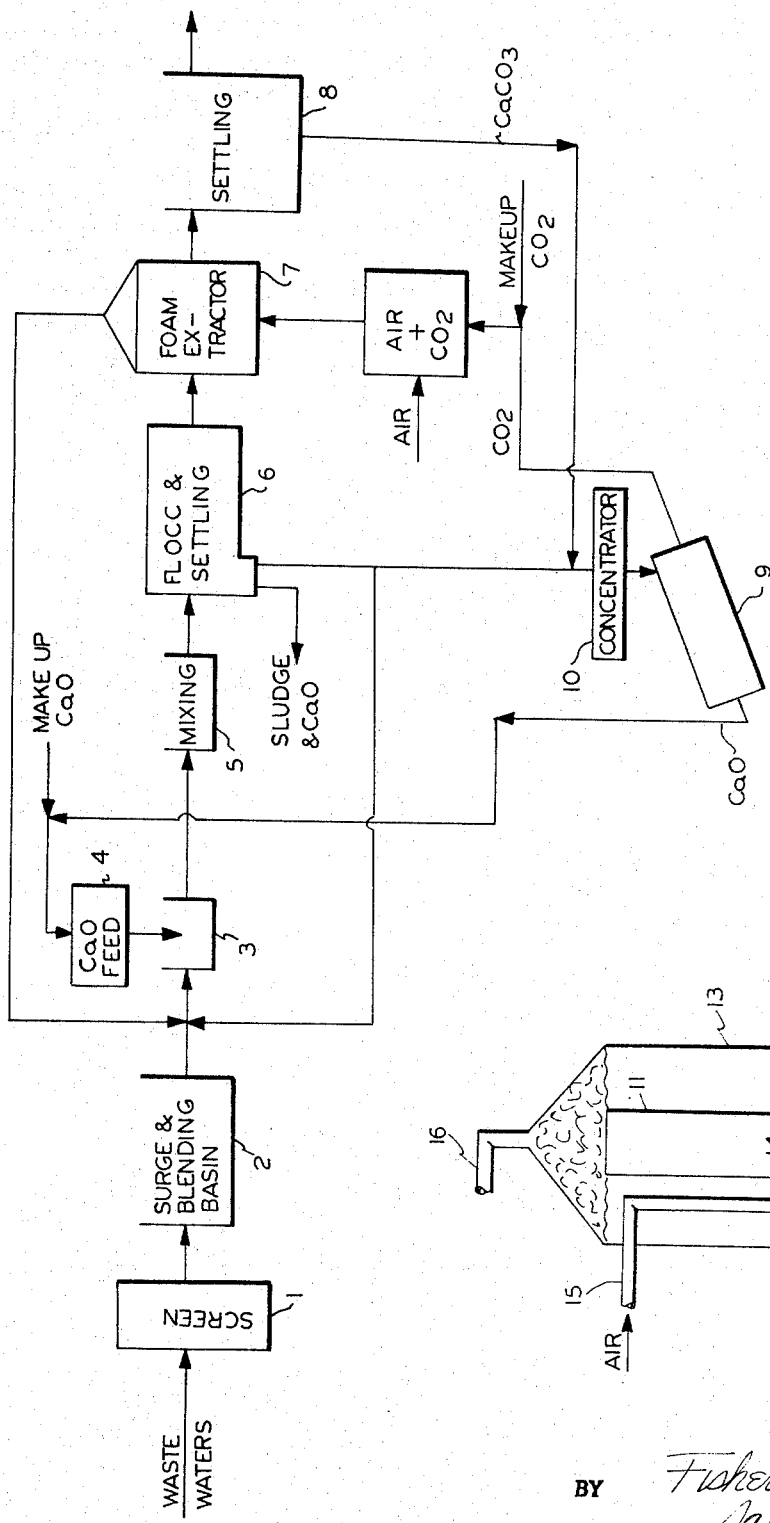
INVENTOR
JAMES C. PANGLE, JR.
BY  Fisher, Christen,
    Sabol & Caldwell
            ATTORNEYS United States Patent Office 3,419,493
Patented Dec. 31, 1968

3,419,493
RECLAIMING WATER FROM TEXTILE MILL
WASTE WATERS
James C. Pangle, Jr., Danville, Va., assignor to Dan River Mills, Incorporated, Danville, Va., a corporation of Virginia
Filed Dec. 22, 1966, Ser. No. 603,965
7 Claims. (Cl. 210—44)

ABSTRACT OF THE DISCLOSURE

Process for treating textile mill waste waters which contain a variety of dyestuffs, a variety of wetting and scouring agents, a variety of finishing chemicals and catalysts, a variety of dyeing assistants, a variety of sizing materials and caustic soda. Lime is mixed with the waste waters to adsorb impurities followed by settling out a major portion of the lime and adsorbed impurities as sludge and aerating the effluent with a gas containing air and carbon dioxide to produce a foam which is removed, broken and recycled to the waste waters. The effluent from the foam is held in a quiescent zone, allowing carbon dioxide to escape and calcium carbonate to precipitate, resulting in reclaimed water. The sludge and precipitated calcium carbonate are burned to provide calcium oxide which is recycled for mixing with the waste waters and carbon dioxide and other gaseous materials which are recycled to the aerating zone.

---

The present invention is directed to a method of treating textile mill waste waters to remove major proportions of the impurities therein and provide reclaimed water suitable for discharge into streams and rivers or suitable for reuse in the textile mill.

Typical textile mill wastes contain a large variety of dyestuffs including substantially complete color ranges of sulfur dyes, vat dyes, fiber reactive dyes, dispersed dyes and other types of dyes, as well as chemicals used in dyeing such as sodium hydrosulfite, sodium chloride, acetic acid, sodium bichromate and the like. In addition, such waste waters can include nonionic, anionic and cationic surface active materials used as wetting and scouring agents. In addition, such waste waters may include various chemicals used in finishing textiles, for example, polyvinyl acetate, polyvinyl alcohol, starch, urea-formaldehyde resins, melamine formaldehyde resins, triazone-formaldehyde resins, uron resins, ethylene urea-formaldehyde resins, modified ethylene urea-formaldehyde resins and other formaldehyde condensates of nitrogen-containing materials. Also included as waste from finishing operations are aqueous solutions or dispersions of acrylic polymers and softeners of the polyethylene type, the cationic type and the fiber reactive types. These finishing wastes also usually contain catalysts in the form of magnesium chloride, zinc nitrate, zinc chloride, zinc fluoborate and other organic salts. In addition, typical textile mill wastes include large quantities of sizing materials such as carboxymethyl cellulose, natural waxes, pectins and other sizing materials. Caustic soda is also present in such waste waters as a result of its use in many cotton textile operations.

The impurities in textile mill wastes are either dissolved or suspended in finely divided dispersions. The biological oxygen demand (BOD) of such mill wastes is quite high and the pH, due to the presence of caustic soda, is well above 7.

As illustrated by U.S. Patent 1,263,532, it has been proposed to introduce carbon dioxide in the form of smoke or flue gas into sewage or factory waste waters which have been previously treated with lime for the purposes of neutralizing the water and removing the lime contained therein by precipitation as calcium carbonate. Procedures such as the one described in this patent produce very large quantities of calcium carbonate and require huge amounts of carbon dioxide in order to be effective. While the patent teaches that smoke or flue gas can be employed as a carbon dioxide source, such use is undesirable today because of the large amounts of impurities such as, for example, coal tar, sulfur gases, and soot contained in smoke or flue gases. These impurities become dissolved or suspended in the water being treated and result in re-contamination of the water. Another problem of procedures such as those disclosed by this patent is in the handling and disposal of huge amounts of calcium carbonate produced.

It has also been well known, especially in the paper industry, to decompose calcium carbonate in a kiln into calcium oxide and carbon dioxide which are then reused such as in the pulping process. An example of this procedure for regenerating lime and carbon dioxide is illustrated in U.S. Patent 3,268,387. While useful in the paper industry for recovery of materials used in a manufacturing process, the application of such regeneration procedures generally has been found to be so expensive in the treatment of waste waters as to be impractical.

The present invention provides a process for reclaiming water from textile mill waste waters in an economical and practical manner and in such a fashion that the reclaimed water is not substantially re-contaminated. The invention is based in part on the adsorption of impurities in such waste waters utilizing calcium oxide and removing, as by settling, the major amount of calcium oxide containing adsorbed impurities from the waste waters and then treating the waste waters with air and carbon dioxide to remove further impurities as foam while at the same time lowering the pH and removing substantially all of the remaining calcium content of the resulting waste waters. The proportionate amount of carbon dioxide added is sufficient to lower the pH to a value of not less than 6.5 preferably about 6.5 to about 8.5. The invention provides for the regeneration in an economical manner of calcium oxide and carbon dioxide from the sludge containing calcium oxide and adsorbed impurities and from the precipitated calcium carbonate by which the remaining calcium content has been removed. The regenerated calcium oxide is recycled back to the waste waters for adsorbing additional impurities and the regenerated carbon dioxide is recycled to the aeration step for reclaiming additional calcium content.

In the drawing:

FIG. 1 is a flow diagram illustrating the treatment of textile mill waste waters by the procedures of the present invention, and FIG. 2 is a diagrammatic cross-section of one type of foam extractor which can be used in the process illustrated in FIG. 1 illustrating one mode by which carbon dioxide is introduced.

Textile mill waste waters containing the impurities described hereinabove are first passed through a screen 1 to remove coarse particles and fibers. This screen can be of any conventional type and preferably is of a type which can be readily cleaned without interrupting the process for any substantial length of time.

The screened waters are then passed into a surge and blending basin 2 having a sufficient capacity to accommodate surges of waste water coming from the mill and to provide a uniform flow of waste waters into the following system. The basin 2 also permits the waste waters to be uniformly blended, for example, waste waters from a finishing operation would normally be discharged at a different time than the waste waters of a dyeing operation or a sizing operation or other operations. Basin 2 thus is of a sufficiently large capacity to receive waste waters from several different mill operations and thus result in a blended waste water having a composition as uniform as possible over a period of time. It will be adequate if the capacity of basin 2 is large enough to hold waters from all of the mill operations over a one to five day period.

The blended waste waters from basin 2 are then fed to the calcium oxide feed zone 3 into which calcium oxide is fed from a hopper 4, for example, at the rate of about 600 to 1000 pounds per million gallons of waste waters being treated, is supplied primarily by the regeneration system hereinafter described and by the addition of make-up calcium oxide obtained from other sources. A mixture of waste waters and calcium oxide is fed from zone 3 into mixing zone 5 wherein thorough and uniform mixing takes place. This mixing can be accomplished in any suitable manner. A plurality of pumps mounted in the waters and having their inlets and discharge outlets placed at strategic locations for producing optimum recirculation have been found to be adequate. Thereafter, the mixture is passed to a relatively quiescent settling zone 6 where the major portion of calcium oxide is permitted to settle out. While the calcium oxide is in contact with the waste waters in zones 3, 5 and 6, it adsorbs impurities from the waste waters. These impurities are carried with the calcium oxide when it settles out in zone 6, thus providing a sludge containing calcium oxide and impurities adsorbed thereon. The quiescent zone 6 can utilize scraper flights for assisting in the flocculation and settling of the sludge and concentrating and accumulating it. Some of the sludge withdrawn from quiescent zone 6 can be recycled back for re-introduction into the waste waters as they leave the basin 2 or some of it can be recycled to the mixing zone 5 for re-introduction into the waste waters. If desired, some or all of the sludge can be fed to the concentrator 10 and kiln 9 as described more fully hereinafter.

The supernatant liquid in quiescent zone 6 is then withdrawn and passed to a foam extractor 7 wherein a gas containing air, for example, at the rate of 25,000 to 30,000 pounds per million gallons of waste waters, and carbon dioxide, for example, at the rate of 1000 to 1500 pounds per million gallons, is bubbled through it to form in the upper portions of the extractor a foam containing calcium oxide and additional impurities. The amount of $CO_2$ added should be sufficient to adjust the pH as close to neutral as possible, and preferably to a pH of not less than 6.5 so as not to interfere with the foam formation and so as to avoid further subsequent pH adjustment to render the clarified water suitable for reuse or discharge into streams and rivers. At this stage, it is preferable to adjust the pH to a value in the range of about 6.5 to about 8.5. Foam formation is assisted by maintaining a lower than atmospheric pressure in the upper areas of the extractor. The foam is withdrawn, for example, by means of suction, broken, for example, by means of rotating fan blades, and recycled back to the waste waters, for example, as they emerge from basin 2.

The liquid in the extractor 7 is withdrawn at a point near the bottom of the extractor and passed to a second relatively quiescent zone 8 wherein excess carbon dioxide contained by the effluent is allowed to escape and calcium carbonate suspended in the liquid is allowed to precipitate. Air can be bubbled through quiescent zone 8 in order to assist the carbon dioxide in escaping and to provide the desired dissolved oxygen level in the water. In addition, remaining impurities floc out and are removed in this zone. The second quiescent zone 8 can be in the form of a basin capable of holding a substantial amount of liquid, e.g., one to five days' supply. The purified water is then withdrawn from quiescent zone 8 and either reused in the textile mill or discharged.

The sludge from quiescent zone 6 generally has an approximate 10% to 40% solids content and the precipitates from quiescent zone 8 are withdrawn and concentrated in a suitable concentrator 10, which can be a filter device or a centrifuge, to remove excess water, e.g., to at least 80% solids. The concentrated material is then fed into a kiln 9, which preferably is a rotary kiln, wherein it is decomposed by heat and oxidation into calcium oxide and carbon dioxide. The foam formed in extractor 7 also contains combustible matter adsorbed on calcium oxide particles and, if desired, can be concentrated and burned along with the sludge and calcium carbonate. The calcium oxide thus produced is returned to hopper 4 for subsequent mixing with the waste waters and the carbon dioxide is returned to the reactor 7 for contact with the liquid therein to neutralize same and reduce the calcium oxide content therein.

The carbon dioxide may, if desired, be introduced into the effluent from the foam extractor rather than contacting it with the liquid waste while forming a foam in the extractor. In this alternative, an additional vessel can be employed and the effluent run from the extractor 7 into the additional vessel into which carbon dioxide is fed in a manner that it bubbles up through the effluent. The discharge of the additional vessel can then be fed into settling zone 8.

The calcium content of the liquid waste in the extractor 7 is relatively low since most of the calcium oxide settles out in zone 6. In one example, the calcium content of the liquid fed to the extractor is 2100 p.p.m. and by use of the invention disclosed herein, this content is reduced to 32 p.p.m. Similarly, for example, the pH of the liquid entering extractor 7 is about 12.2 and the liquid leaving the extractor is about 7. The biological oxygen demand (BOD) of the waste waters in passing through the above-described system is reduced drastically to a low level suitable for discharge into streams and rivers. The reclaimed water is also characterized by a very low suspended solids content and a high degree of softness and is well suited for reuse.

It will thus be seen in the above-described process that the major proportion of calcium oxide introduced into the system is withdrawn as calcium oxide and only a relatively minor proportion is converted to calcium carbonate. As a result, the amount of carbonate to be reconverted in the kiln 9 is minimal. In normal operation, the major portion of sludge and calcium oxide is recycled back to the waste waters at a point between surge and blending basin 2 and mixing zone 3. From time to time it will be necessary to remove portions of the sludge and calcium oxide from zone 6 for the purpose of removing impurities and regenerating fresh calcium oxide for reintroduction into mixing zone 3. This is necessary in order to maintain an adequate amount of adsorbing surface on the calcium oxide particles. If desired, the sludge and calcium oxide can be withdrawn from zone 6 and disposed of by other means. Provision is also made for adding fresh make-up calcium oxide and fresh make-up carbon dioxide to the system.

FIG. 2 diagrammatically illustrates one preferred form of foam extractor which can be employed in the above-described system. In this embodiment, the effluent from zone 6 enters a vertical pipe 11 through feed pipe 12 and rises to the upper end of vertical pipe 11 which opens into the interior of the extractor chamber 13. Along the vertical rise of pipe 11 a plurality of air injection nozzles or openings 14 communicating with the interior of pipe 11 are mounted. These nozzles 14 communicate with air inlet pipe 15 for the purpose of introducing air bubbles into the rising column in pipe 11. This arrangement can be similar to that shown in U.S. Patent 2,669,440. The air bubbles formed in the liquid cause a foam to be formed in the upper part of chamber 13 and this foam is drawn off through pipe 16 using suction and is returned, after breaking the foam, to the waste waters prior to mixing zone 3. A perforated pipe 17 is mounted in the lower portions of chamber 13 and communicates with a carbon dioxide feed pipe 18. The perforated pipe 17 can be circular or in the form of a spiral for distributing carbon dioxide in the lower portions of chamber 13.

The liquid after leaving pipe 11 flows in a generally downward path around the exterior of pipe 11 towards outlet 19 which leads to settling zone 8. The carbon dioxide not only assist in foam formation but reduces the pH or alkalinity of the liquid leaving chamber 13 and also converts the calcium content of the liquid to calcium carbonate.

Wherever used herein the term calcium oxide is intended to include the hydrated or slaked form, $Ca(OH)_2$, when water is present and the dehydrated form, $CaO$, when not mixed with water, e.g., after heating in the kiln.

Although the drawing shows one of each type of unit, it will be apparent to one skilled in this art, and, in fact, it is preferred in most cases, to utilize more than one, e.g., four to six, flocculating and settling vessels 6 joined in series flow and more than one, e.g., four to six, foam extractors joined in series flow. Amounts of gaseous materials expressed herein are based on standard conditions.

EXAMPLE

This is an example of a typical operation of the above system for treating approximately 10 million gallons waste water per day. The weights and volumes expressed herein, where indicated, are based on a million gallons of waste waters being treated.

Waste waters from the surge and blending basin 2 in the amount of 10 million gallons per day are fed to zone 3 where 600 pounds of calcium oxide per million gallons is added. The resulting mixture is thoroughly agitated and mixed in zone 5 to produce as uniform a suspension as possible. This suspension is then moved to vessel 6 which is relatively quiescent and utilizes scraper flights to assist the flocculation and settling of a sludge. A sludge is formed in the lower portions of vessel 6 and is withdrawn at the rate of 100,000 pounds per day.

The effluent or supernatant liquid in vessel 6 is then fed into foam extractor 7 at the rate of slightly less than 10 million gallons per day. Air at the rate of 20,000 to 30,000 pounds per million gallons is bubbled through the liquid in the extractor and at the same time carbon dioxide at the rate of 1000 to 1500 pounds per million gallons is bubbled through the liquid. The upper portion of the extractor above the liquid level is under a small vacuum and a foam is formed above the liquid. This foam is withdrawn at the rate of 1000 to 3000 gallons per million gallons of waste water fed. The liquid is then fed to settling tank 8 wherein calcium carbonate settles out.

The withdrawn sludge has an approximate solids content of 20 weight percent and is sent to the concentrator 10 along with 2000 to 4000 pounds of calcium carbonate per million gallons withdrawn from settling tank 8 and all of the foam (after breaking) withdrawn from extractor 7. In the concentrator water is removed to produce a concentrated sluge-calcium carbonate-broken foam mixture having a solids content of approximately 80 weight percent. The concentrated sludge is then sent to the kiln 9 where it is heated and burned at a temperature of approximately 1000° C. to convert the calcium oxide and to burn the impurities adsorbed by the calcium oxide in the sludge and broken foam. The output of the kiln 9 thus is approximately 550 pounds of calcium oxide per million gallons of waste waters treated. This calcium oxide is then pulverized, if necessary, to provide a finely divided material. It is then returned to feed hopper 4 for re-introduction into additional waste waters. Make-up calcium oxide at the rate of 50 to 100 pounds per million gallons is also added to the feed hopper. The gaseous exhaust from the kiln 9 comprises the gaseous combustion products of the fuel used to heat the kiln, the gaseous combustion products resulting from burning the impurities carried by the lime and carbon dioxide resulting from the decomposition of calcium carbonate. These gaseous products contain substantial amounts of carbon dioxide and are returned to the foam extractor 7 along with 50 to 500 pounds of make-up carbon dioxide per million gallons. If it is desired, the combustion gases can be processed to concentrate the carbon dioxide contained therein.

The water effluent from the settling tank 8 is withdrawn and is characterized by a pH of approximately 7 to 7.5, a calcium content of less than about 32 parts per million, a very low BOD and a low degree of hardness.

What is claimed is:

1. In the process of treating textile mill waste waters containing objectionable suspended matter including color materials and alkaline materials wherein said waste waters are contacted with calcium oxide and substantial proportions of said objectionable suspended matter are absorbed on said calcium oxide and removed by settling a substantial proportion of said calcium oxide as sludge, thus leaving an effluent depleted in said objectionable suspended matter and containing some suspended calcium, that improvement comprising, contacting said depleted effluent with $CO_2$ and air to convert the calcium content thereof to calcium carbonate and to form a foam carrying additional amounts of remaining suspended matter, precipitating said calcium carbonate, separating the foam as such from said effluent, and simultaneously burning said sludge and heat-decomposing said precipitated calcium carbonate to regenerate calcium oxide and carbon dioxide.

2. Improvement as claimed in claim 1 wherein said foam is broken and burned along with said sludge and calcium carbonate.

3. Improvement as claimed in claim 1 wherein the regenerated calcium oxide is recycled and contacted with additional waste waters.

4. Improvement as claimed in claim 1 wherein said regenerated carbon dioxide is recycled and contacted with additional depleted effluent.

5. Improvement as claimed in claim 1 wherein said foam is formed on the surface of said depleted effluent and said depleted effluent is contacted with air and carbon dioxide below said surface.

6. Improvement as claimed in claim 5 wherein said depleted effluent is separately contacted with air and then carbon dioxide under said surface.

7. In the treatment of textile mill waste water containing objectionable suspended matter including color materials and alkaline materials to reclaim said water, the process comprising:
  (a) feeding said waste water to a surge and blending basin,
  (b) feeding said waste water from said surge and blending basin to a chemical addition zone and, therein, adding calcium oxide thereto,
  (c) feeding the waste water-calcium oxide to a mixing zone and, therein, thoroughly mixing the waste water and calcium oxide,
  (d) feeding the resulting mixture to a quiescent zone and, therein, allowing sludge to flocculate and settle from said mixture,
  (e) feeding the liquid effluent from said quiescent zone to a foam extractor and, therein, passing a gas containing air and carbon dioxide through said effluent to form a foam at the top of said extractor,
  (f) feeding the liquid effluent from said extractor to a quiescent zone and, therein, allowing $CO_2$ from said effluent to escape and calcium carbonate to precipitate, and withdrawing the liquid effluent as reclaimed water,
  (g) withdrawing the foam from said extractor, breaking up said foam and recycling said foam to said chemical addition zone, (h) withdrawing said sludge from said first-mentioned quiescent zone and withdrawing said precipitated calcium carbonate from said second-mentioned quiescent zone and heating and oxidizing said withdrawn sludge and calcium carbonate to decompose same into calcium oxide, carbon dioxide and other gaseous oxides, (i) recycling said carbon dioxide resulting from the heating and oxidizing of said sludge and calcium carbonate to said foam extractor for contacting with the effluent therein, and (j) recycling said calcium oxide to said chemical addition zone for contacting with the effluent therein.

References Cited

UNITED STATES PATENTS

| | | | |
|---|---|---|---|
| 1,263,532 | 4/1918 | Cummings | 210—42 |
| 1,426,596 | 8/1922 | Peck | 210—44 X |
| 2,044,582 | 6/1936 | Lykken et al. | 210—45 |
| 2,359,748 | 10/1944 | Clemens | 210—45 |
| 3,284,993 | 11/1966 | Sebald et al. | 55—178 |

MICHAEL E. ROGERS, *Primary Examiner.*

U.S. Cl. X.R.

210—45, 73